US009011073B2

(12) United States Patent  
Dieziger

(10) Patent No.: US 9,011,073 B2  
(45) Date of Patent: Apr. 21, 2015

(54) TRUCK LOADING DEVICE

(76) Inventor: David Douglas Dieziger, Missoula, MT (US)

( * ) Notice: Subject to any disclaimer, the term of this patent is extended or adjusted under 35 U.S.C. 154(b) by 771 days.

(21) Appl. No.: 13/277,389

(22) Filed: Oct. 20, 2011

(65) Prior Publication Data

US 2013/0101375 A1    Apr. 25, 2013

(51) Int. Cl.
*B60P 1/00* (2006.01)
*B60P 1/43* (2006.01)
*B60P 1/64* (2006.01)
*B60P 1/14* (2006.01)

(52) U.S. Cl.
CPC .............. *B60P 1/433* (2013.01); *B60P 1/6427* (2013.01); *B60P 1/14* (2013.01)

(58) Field of Classification Search
CPC .............. B60P 3/07; B60P 3/122; B60P 1/16; B60P 1/6454; B60P 1/14; B60P 1/025; B60P 1/34; B60P 1/431; B60P 1/18; B60P 1/6427; B60P 1/6463; B60P 3/1058; B60P 7/13; B60P 3/1033; B60P 3/1025; B60P 1/6419; B60P 1/649; B60P 1/44; B60P 1/4407; B60P 1/64; B62B 3/04; B62D 53/062; B60R 9/06; B60R 9/10; B60R 9/042
USPC ......... 414/469, 471, 475, 477, 498, 462, 500, 414/506
See application file for complete search history.

(56) References Cited

U.S. PATENT DOCUMENTS

| | | | |
|---|---|---|---|
| 2,021,952 A * | 11/1935 | Wren .............................. | 414/500 |
| 3,411,646 A | 11/1968 | Emery | |
| 3,522,894 A * | 8/1970 | Tornheim ....................... | 414/469 |
| 3,672,524 A | 6/1972 | Conrad | |
| 3,894,643 A | 7/1975 | Wilson | |
| 3,976,213 A | 8/1976 | Ball | |
| 4,020,961 A | 5/1977 | Musgrove | |
| 4,527,941 A * | 7/1985 | Archer .......................... | 414/537 |
| 4,548,541 A * | 10/1985 | Corompt ....................... | 414/479 |
| 4,993,088 A | 2/1991 | Chudik | |
| 5,046,913 A | 9/1991 | Domek | |
| 5,090,335 A | 2/1992 | Russell | |
| 5,203,667 A * | 4/1993 | Yoneda et al. ................ | 414/477 |
| 5,232,329 A | 8/1993 | Livingston | |
| 5,269,642 A * | 12/1993 | Zoromski ...................... | 414/392 |
| 5,354,164 A * | 10/1994 | Goss et al. .................... | 414/462 |
| 5,556,249 A * | 9/1996 | Heine ............................ | 414/500 |
| 5,732,996 A * | 3/1998 | Graffy et al. .................... | 296/62 |
| 5,755,549 A * | 5/1998 | Ogrodnick .................... | 414/500 |
| 5,807,058 A * | 9/1998 | Masse ............................ | 414/477 |
| 5,829,945 A | 11/1998 | Stanley | |
| 6,419,292 B1 | 7/2002 | Calcote | |
| 6,524,056 B1 * | 2/2003 | Kloster ......................... | 414/538 |
| 6,769,858 B1 * | 8/2004 | Butler et al. .................. | 414/462 |
| 7,033,128 B2 * | 4/2006 | Poindexter .................... | 414/544 |
| 7,338,104 B1 | 3/2008 | Bejin | |
| 8,534,978 B2 * | 9/2013 | Dieziger ....................... | 414/500 |
| 2008/0112786 A1 | 5/2008 | Deist | |
| 2009/0257854 A1 | 10/2009 | Wright | |
| 2010/0272549 A1 * | 10/2010 | Petty ............................. | 414/500 |

* cited by examiner

*Primary Examiner* — Saul Rodriguez
*Assistant Examiner* — Glenn Myers
(74) *Attorney, Agent, or Firm* — Lawrence Lambelet

(57) ABSTRACT

An apparatus for loading the bed of a pickup truck comprises a brace for supporting a load from the ground, the brace preventing the load from applying weight to the tail end of the bed with damaging consequences while being drawn into position by a winch and cable system. A pallet is used to stage the load on the ground and to provide a structure with a low angle of attack to the brace, the low angle of attack facilitating the transition of the load to the bed by reducing the tipping moment over the brace.

11 Claims, 5 Drawing Sheets

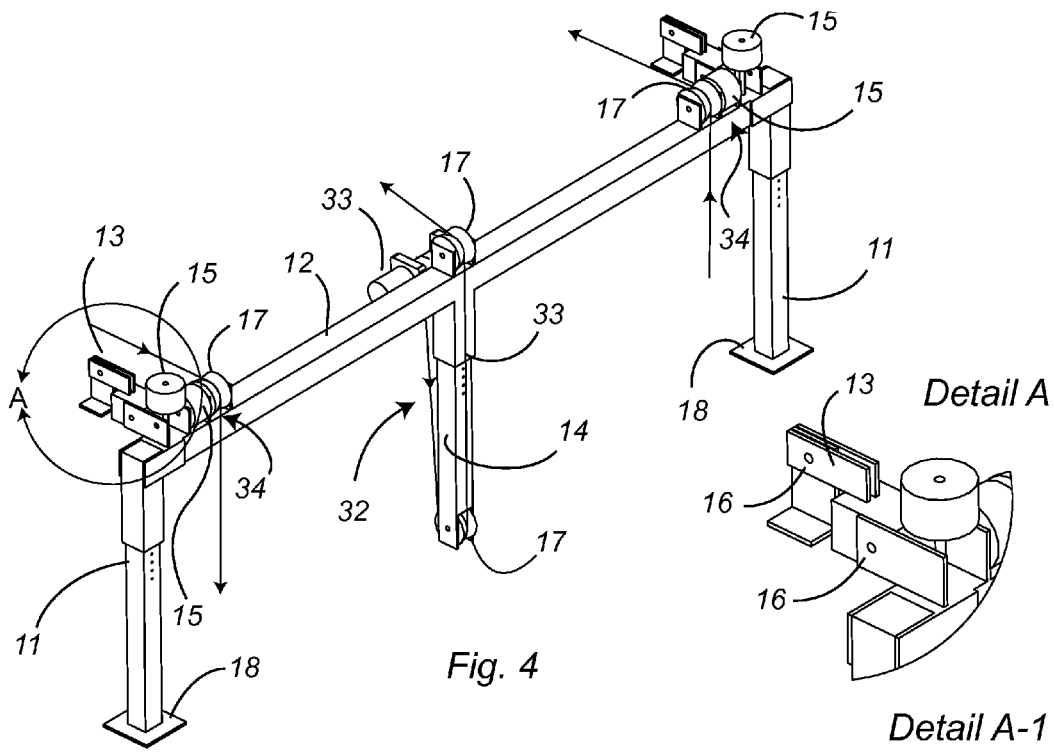
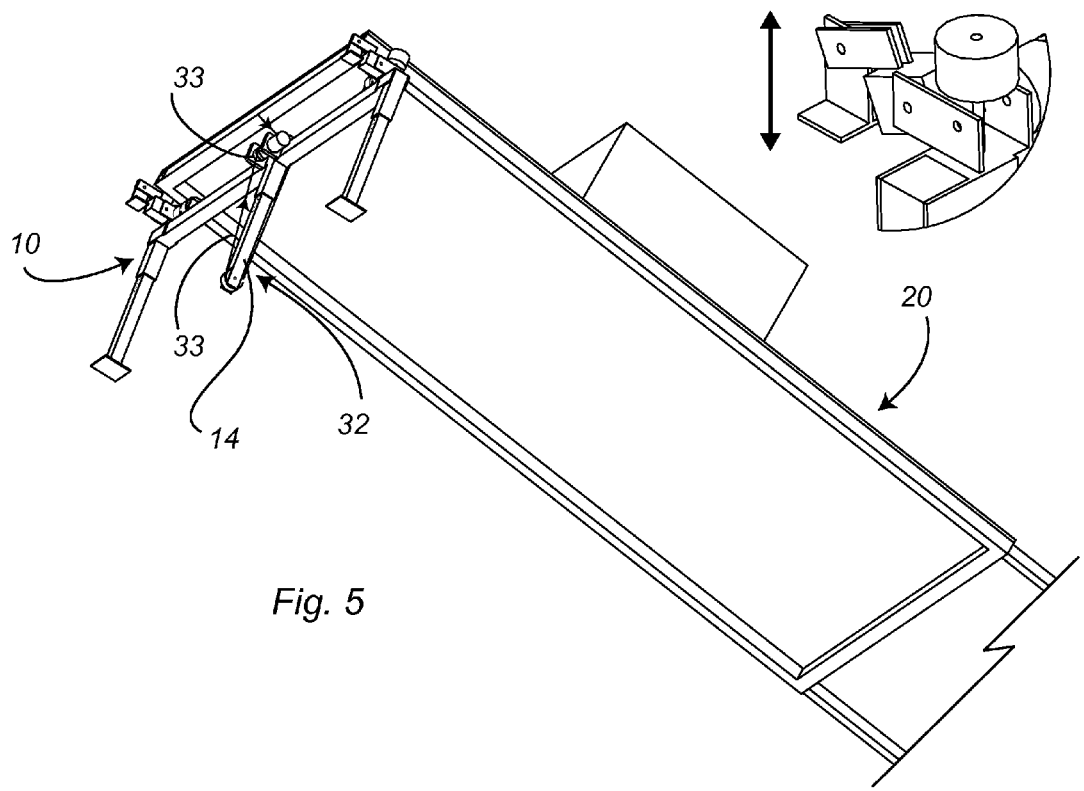
Fig. 4
Detail A
Detail A-1
Fig. 5

TRUCK LOADING DEVICE

FIELD OF THE INVENTION

This invention relates to loading devices for trucks, and more particularly to winch-driven loading devices for pickup trucks.

BACKGROUND OF THE INVENTION

Loading a truck bed, such as on a pickup truck, sometimes involves heavy or unwieldy lifting in a situation where mechanized equipment is unavailable for the task. Such a situation might occur in a home or field environment. Such a case can be made for snowmobiles, four-wheeled recreational vehicles, boats, game carcasses, or camper-inserts, to name a few objects which are too large or too heavy for manual manipulation. Another case can be made for aggregated loads, such as firewood, shingle bundles, building blocks, or soil, fertilizer, or salt in bags, where lifting individual pieces one-at-a-time would be inefficient. In all cases, it is useful to stage the load at ground level and use a portable device to lift and transfer the load onto the truck bed.

A winch and cable system powered by a battery comprises an easily portable device to drag a load onto a truck bed. In U.S. Pat. No. 5,232,329 to Livingston, a snowmobile loaded onto a ground-level pallet is lifted by a winch at the end of a boom. The boom doubles as a platform which can be raised to lift the load and then lowered by hydraulic means to receive the load at an appropriate incline. The loaded platform is then further lowered into the truck bed. The platform and associated hydraulics, however, must be installed in the truck, rendering the bed thereby unusable for other purposes.

In U.S. Pat. No. 3,894,643 to Wilson, a boat is hoisted onto the rear of a pickup truck by means of a winch tugging against a pair of articulating brace members, said members braced against both the rear and the ground to scissor the load thereby upwardly. During the lift, however, the forces of the weight of the boat and the downward pull of the winch cable are collectively applied to the tail, or rearward-most part, of the vehicle. At the tail, in such an extreme position, the forces are applied against the suspension and the frame with damaging leverage.

In U.S. Pat. No. 5,269,642 to Zoromski, a camper-insert with an integrated structure comprising a winch and cable system is elevated at one end to be partially supported by stiff legs. As the load is winched farther onto the stiff legs, the center of gravity shifts to tilt the structure against the tail of the pickup truck bed. Further movement pivots the load over the tail and into the bed while simultaneously lifting the stiff legs. In spite of the temporary supporting role of the stiff legs, they are ultimately rendered ineffective in preventing weight from being applied to the tail in a potentially damaging way.

The present invention provides novel solutions for loading a truck bed without the need for installed structure and without using the tail of the bed as a fulcrum edge.

SUMMARY OF THE INVENTION

It is accordingly an object of the present invention to use a structure supported by stiff legs to carry the weight of a load until the load is substantially transferred into the truck bed. It is a further object to use a winch and cable system as a means for transferring the load. It is a further object to minimize the pitch of the load at the point of tipping onto the supporting structure, thereby requiring less winch power. It is a further object to provide a platform for assembling a load on the ground. It is a further object to provide said platform with sufficient rigidity to cantilever weight over the supporting structure. It is a further object to allow the truck bed to move independently from the supporting structure while recoiling from the load burden. It is a further object to provide a loading apparatus which can be disassembled into component parts for portability.

These objects, and others to become hereinafter apparent, are embodied in an apparatus for loading a load onto a truck with a bed having an open end comprising, in a first part, a brace for supporting the load from the ground, the brace comprised of at least two upright stiff legs joined proximate the top by a crossbar, the crossbar at or above the level of the bed, the brace stabilized by at least one connector bar hingingly attached between the brace and the open end; in a second part, a pallet on which the load is placed while resting on the ground; and, in a third part, a means for drawing the loaded pallet over the crossbar and into the bed. With the apparatus configured in this way and operating in this manner, the weight of the loaded pallet is substantially supported by the brace from the ground to avoid thereby a dynamic weighting of the open end, and the horizontal thrust from pivoting the weight over the brace is transferred to the truck through the at least one connector bar, the bed under loading capable of articulating vertically through the hinged attachment of the at least one connector bar.

In a preferred embodiment, the means for drawing comprises a first winch and cable system attached between the bed and the pallet. The preferred embodiment further comprises a means for unloading, wherein the means for unloading comprises a second winch and cable system attached between the brace and the front of the pallet. The means for unloading further comprises an at least third stiff leg placed centrally with respect to the crossbar, the at least third stiff leg serving to operationally direct the cable of the second winch and cable system while providing a vertical rail to prevent the pallet from diving beneath the crossbar. The preferred embodiment still further comprises a means for minimizing the tipping moment of the pallet over the crossbar while pivoting there upon, the means for minimizing the tipping moment comprising an extension to the pallet perpendicular to the crossbar, the extension essentially reducing the angle of attack to the crossbar.

As this is not intended to be an exhaustive recitation, other embodiments may be learned from practicing the invention or may otherwise become apparent to those skilled in the art.

DESCRIPTION OF THE DRAWINGS

Various other objects, features and attendant advantages of the present invention will become fully appreciated as the same becomes better understood through the accompanying drawings, in which like reference characters designate the same or similar parts throughout the several views, and wherein:

FIG. 4 is a perspective view of the brace, in which detail A shows the connector bar and detail A-1 shows the connector bar articulating when the truck bed is loaded;

FIG. 5 is a partial perspective view of the apparatus showing the second winch and cable system loading.

DETAILED DESCRIPTION OF THE PREFERRED EMBODIMENT

Figure 1:
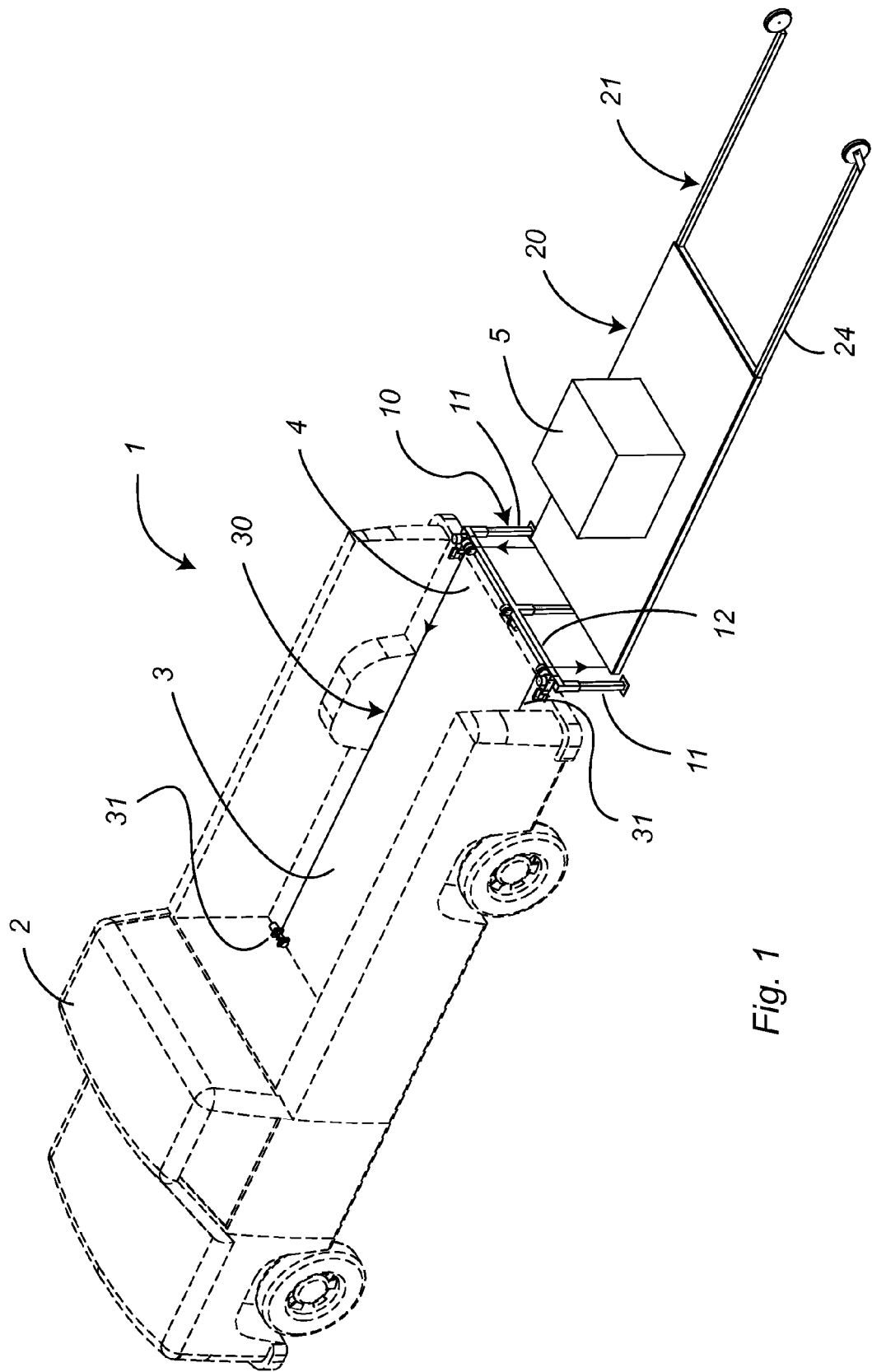
FIG. 1 is a perspective view of the apparatus of the present invention with the load staged on the ground.
Figure 2:
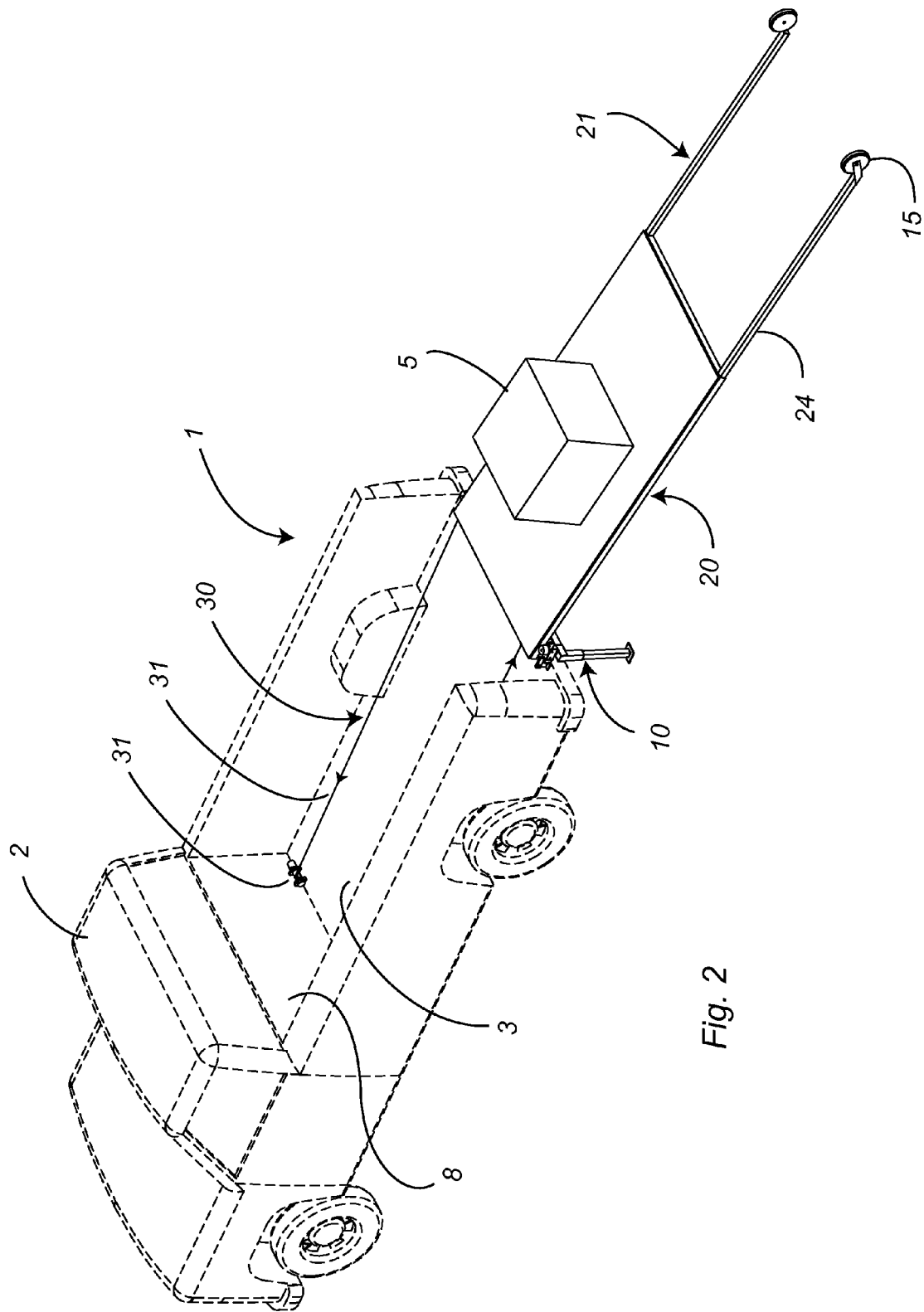
FIG. 2 is a perspective view with the load lifted onto the crossbar of the brace during loading.

The constituent components of the present invention are best shown in FIGS. 1 and 2. An apparatus for loading 1 a load 5 onto a truck 2 having a truck bed 3 with an open end 4 is comprised of a brace 10, a pallet 20 on which the load 5 is placed, and a means for drawing 30 the loaded pallet 20 over the brace 10 and onto the truck bed 3.

In the preferred embodiment, the means for drawing 30 is a first winch and cable system 31. The winch is typically located at the end of the truck bed opposite the open end 4 to maximize the length of the draw. In the preferred embodiment, the cable is dead-headed at or near the cab bulkhead 8 such that the winch has a two-to-one purchase in drawing the loaded pallet 20. One or more turning blocks (not shown) may be used on the front end of the pallet to reverse the direction of the cable.

Referring to FIGS. 1 and 4, the brace 10 is comprised of at least two upright stiff legs 11 joined proximate the top ends thereof by a crossbar 12. The structure thus formed provides a fulcrum resting on a ground surface 6 (FIG. 3), the fulcrum balancing the pallet 20 once the same is lifted thereon. The stiff legs 11 may be comprised of telescoping sections to adjust for height. The preferred height is level with, or higher than, the open end 4 of the truck bed 3. The preferred height assures that center of gravity of the load 5 will transition the open end 4 prior to any weight being brought to bear on the truck bed 3, and particularly on the open end 4. The stiff legs 11 may also be provided with bases 18, which function to distribute weight and prevent penetration into the ground.

In the preferred embodiment, the crossbar 12 is provided with a means for reducing frictional drag 34. In a particular preferred embodiment, the means for reducing frictional drag is rollers 15, said rollers serving to both guide the pallet 20 and reduce friction as the pallet is drawn over the crossbar. The crossbar 12 may also be provided with sheaves 17 to guide the cable of the first winch and cable system 31.

The brace 10 is stabilized in an upright position by at least one connector bar 13 hingingly attached between the brace 10 and the open end 4, as shown in detail A of FIG. 4. In the preferred embodiment, there are two connector bars 13 spaced apart and near the sheaves 17 to transmit a horizontal component of the loaded pallet 20 to the truck 2 as the cantilevered weight of the load is drawn over the crossbar 12. Each connector bar 13 is hinged by hinges 16 at both the point of attachment at the open end 4 and at the brace 10. The bi-lateral hinging thus allows articulation of the connector bar 13 in response to the recoil of truck bed 3, weighted by its burden, essentially independent of the brace 10, as shown in detail A-1 of FIG. 4.

Referring to FIGS. 4 and 5, the apparatus for loading 1 is further comprised of a means for unloading 32. The means for unloading 32 is comprised of a second winch and cable system 33 attached between the brace 10 and the leading edge of the pallet 20. In the preferred embodiment, the winch of the second winch and cable system 33 is mounted on or above a third stiff leg 14 placed centrally with respect to the crossbar 12. The third stiff leg 14 serves to operationally direct the cable through sheaves 17 placed at top and bottom ends of the third stiff leg. The third stiff leg 14 also serves to provide a vertical rail for transitioning the pallet 20 to the ground 6 while preventing the pallet from diving beneath the crossbar during descent there from. During loading, the first winch and cable system 31 is spooling in, as shown by the directional arrows in FIG. 4, while the second winch and cable system 33 is free-wheeling and unspooling. During unloading, on the other hand, the second winch and cable system is spooling, as shown in FIG. 5, while the first system is either free-wheeling, or otherwise, providing a braking action.

Figure 3:
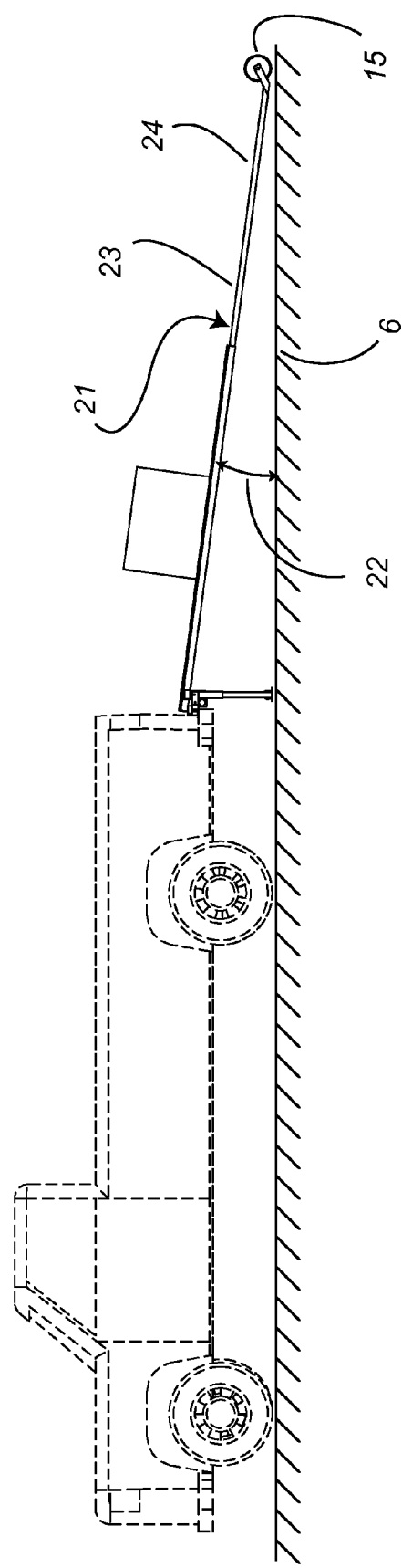
FIG. 3 is an elevation view showing the angle of attack.

Referring to FIGS. 1-3, the pallet 20 is initially placed on the ground 6 to facilitate loading. Objects comprising a load may be handily placed on the pallet 20 while relying on the first winch and cable system 31 to lift the load by drawing the leading, or front, edge of the pallet 20 to the height of the crossbar 12. Upon reaching the crossbar, the trailing, or back, edge of the pallet defines the apex of an angle-of-attack 22 with the ground 6, as shown in FIG. 3. The angle-of-attack 22 controls the tipping moment of the pallet as advancement draws the back edge off the ground and balances the weight in a pivot over the crossbar. The shallower the angle, the less the force required to rotate the cantilevered center of gravity of the loaded pallet 20 over the fulcrum of the crossbar 12; and, consequently, the smaller the force applied by the winch.

A means for minimizing the tipping moment 21 comprises an extension 23 to the pallet 20 in a direction perpendicular to the crossbar 12. The tipping moment is minimized because the angle-of-attack 22 is reduced by this configuration. The angle-of-attack 22 is reduced because the angle rays, namely the extended pallet 20 and the included ground 6, are lengthened while the triangular side opposite, the brace 10, is held constant. In the preferred embodiment, the extension 23 is comprised of a light-weight skeleton structure to further reduce the tipping moment. In a particular preferred embodiment, the extension 23 is comprised of frame elements 24, which may telescope within frame members of the pallet 20, and may be removed for transport and storage. The frame elements 24 may terminate in rollers 15 to facilitate frictionless ground contact.

In an alternate embodiment, a unitary load 25 (not shown), such as a camper insert, may substitute for the pallet 20. The unitary load 25 must have a structure sufficiently rigid to cantilever its weight. The unitary load 25 may also be provided with the means for minimizing the tipping moment 21.

Figure 6:
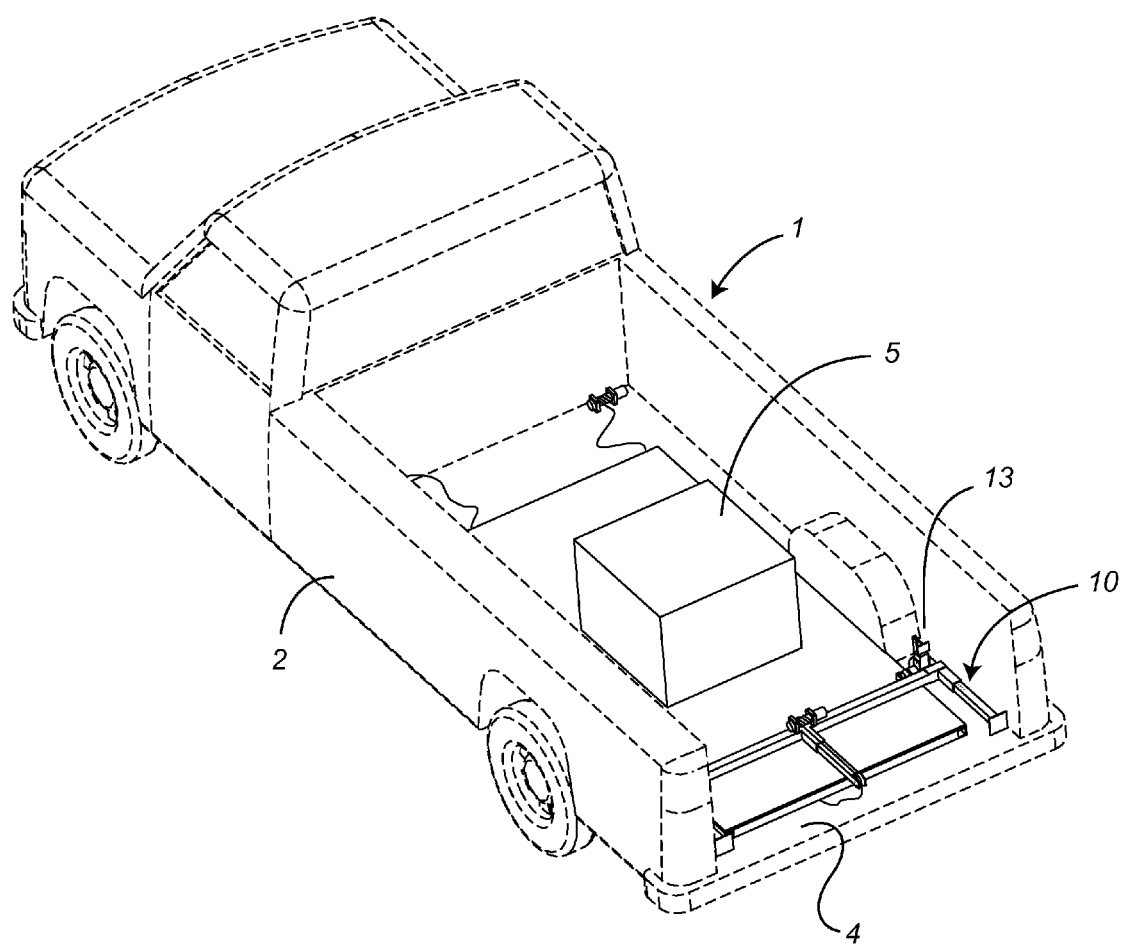
FIG. 6 is a perspective view of the loaded truck bed with the apparatus disassembled for onboard stowage.

The loaded configuration of the truck 2 is shown in FIG. 6. The apparatus for loading 1 may be disassembled and rendered portable by detaching the at least one connector bar 13 from the open end 4. To serve that purpose in the preferred embodiment, the hinges 16 are comprised of a cotter pin to facilitate separation. The frame elements 24 may also be removed and stowed (not shown).

It is to be understood that the invention is not limited in its application to the details of construction and to the arrangements of the components set forth in the preceding description or illustrated in the drawings. For example, rails may be provided in the truck bed 3 to reduce the frictional engagement of the pallet 20 with the bed. Also, it is to be understood that the phraseology and terminology employed herein are for the purpose of the description and should not be regarded as limiting.

What is claimed is:

1. An apparatus for loading a load onto a truck with a bed having an open end, comprising:
    a brace capable of supporting the load from the ground separately from the truck, the brace comprised of at least two upright stiff legs joined proximate the top by a crossbar, the crossbar at or above the level of the bed, the brace stabilized by at least one connector bar hingingly attached between the brace and the open end;
    a pallet on which the load is placed while resting on the ground;

a means for drawing the loaded pallet over the crossbar and into the bed;

a means for unloading;

whereas, during said drawing, the weight of the loaded pallet is substantially supported by the brace from the ground to avoid thereby a dynamic weighting of the open end, and the horizontal thrust from pivoting the weight over the brace is transferred to the truck through the at least one connector bar, the bed under loading capable of recoiling vertically through the articulation of the hinged attachment of the at least one connector bar.

2. The apparatus of claim 1, further comprising an extension to the pallet perpendicular to the crossbar, thereby essentially reducing the angle of attack to the crossbar and achieving minimal tipping moment of the pallet over the crossbar.

3. The apparatus of claim 2, wherein the extension is achieved by light-weighting the extension structure.

4. The apparatus of claim 1, further comprising rollers at contact points of the pallet with the crossbar and the ground to reduce frictional drag.

5. The apparatus of claim 1, wherein the at least one connector bar is hingingly attached through one hinge at the open end and another hinge at the brace, the hinges cooperating bi-laterally to isolate the brace from movement of the bed.

6. An apparatus for loading and unloading a load onto a truck with a bed having an open end, comprising:

a brace capable of supporting the load from the ground separately from the truck, the brace comprised of at least two upright stiff legs joined proximate the top by a crossbar, the crossbar at or above the level of the bed, the brace stabilized by at least one connector bar hingingly attached between the brace and the open end;

a pallet on which the load is placed while resting on the ground;

a first winch and cable system attached between the bed and the pallet for drawing the loaded pallet over the crossbar and into the bed; and a second winch and cable system attached between the brace and the front of the pallet for drawing the pallet over the crossbar and onto the ground, the second winch and cable system having an at least third stiff leg placed centrally with respect to the crossbar, the at least third stiff leg serving to operationally direct the cable of the second winch and cable system, the at least third stiff leg providing a vertical rail to prevent the pallet from diving beneath the crossbar;

whereas, during said drawing, the weight of the loaded pallet is substantially supported by the brace from the ground to avoid thereby a dynamic weighting of the open end, and the horizontal thrust from pivoting the weight over the brace is transferred to the truck through the at least one connector bar, the bed under loading capable of recoiling vertically through the articulation of the hinged attachment of the at least one connector bar.

7. The apparatus of claim 6, further comprising an extension to the pallet perpendicular to the crossbar, thereby essentially reducing the angle of attack to the crossbar and achieving minimal tipping moment of the pallet over the crossbar.

8. The apparatus of claim 7, wherein the extension is achieved by light-weighting the extension structure.

9. The apparatus of claim 6, further comprising rollers at contact points of the pallet with the crossbar and the ground to reduce frictional drag.

10. The apparatus of claim 6, wherein the at least one connector bar is hingingly attached through one hinge at the open end and another hinge at the brace, the hinges cooperating bi-laterally to isolate the brace from movement of the bed.

11. An apparatus for loading a truck with a bed having an open end, comprising:

a unitary load with a rigid structure;

a brace capable of supporting the load from the ground separately from the truck, the brace comprised of at least two upright stiff legs joined proximate the top by a crossbar, the crossbar at or above the level of the bed, the brace stabilized by at least one connector bar hingingly attached between the brace and the open end;

a means for drawing the unitary load over the crossbar and onto the bed; and a means for unloading;

whereas, during said drawing, the weight of the unitary load is substantially supported by the brace from the ground to avoid thereby a dynamic weighting of the open end, and the horizontal thrust from pivoting the weight over the brace is transferred to the truck through the at least one connector bar, the bed under loading capable of recoiling vertically through the articulation of the hinged attachment of the at least one connector bar.

* * * * *